Sept. 1, 1964   O. CHAMBERLIN   3,146,529

HOUSE TRAILER LEVELING INDICATOR

Filed Oct. 1, 1962

Ogden Chamberlin
INVENTOR.

BY *Clarence A. O'Brien*
and *Harvey B. Jackson*
Attorneys

United States Patent Office 3,146,529
Patented Sept. 1, 1964

3,146,529
HOUSE TRAILER LEVELING INDICATOR
Ogden Chamberlin, Loring, Mont.
(39 Paramount Ave., Escondido, Calif.)
Filed Oct. 1, 1962, Ser. No. 227,176
6 Claims. (Cl. 33—207)

This invention relates to a novel and useful house trailer leveling indicator and more specifically to a spirit level which is primarily designed for the purpose of rendering an indication when a house trailer is disposed exactly horizontally.

Although the leveling indicator of the instant invention has been primarily designed for use with house trailers and the like such as camping and travel trailers, it is to be understood that the leveling indicator is also adapted for securement to other pieces of equipment for indicating when that equipment is horizontally disposed.

The house trailer leveling indicator of the instant invention may be secured to any internal or external surface of a house trailer in a location where it will be unobtrusive and somewhat obscure in order that it will be quite unlikely that persons not understanding the purpose of the leveling indicator will be attracted by its presence and unknowingly alter its position relative to the piece of equipment on which it is mounted.

The house trailer leveling indicator will be used only when the trailer or piece of equipment to which it is secured is being leveled by means of jacks in a temporary location.

The main object of this invention is to provide a leveling indicator which may be readily secured to substantially any planar surface of a trailer or similar piece of equipment in a manner whereby it will be capable of rendering an indication of whether or not the piece of equipment is horizontally disposed.

A further object of this invention, in accordance with the immediately preceding object, is to provide a leveling indicator primarily designed for securement to an upstanding surface and including a pair of spirit levels disposed at substantially right angles to each other and mounted for adjustable rotation about an axis extending at right angles to one of the spirit levels.

Another object of this invention is to provide a novel mounting clamp for mounting the spirit levels of the leveling indicator in a manner whereby the leveling indicator may be clampingly engaged in adjusted rotated position relative to the mounting clamp and mounted upon a supporting surface by means of the mounting clamp upon manipulation of a single actuator.

A final object to be specifically enumerated herein is to provide a house trailer leveling indicator in accordance with the preceding objects which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
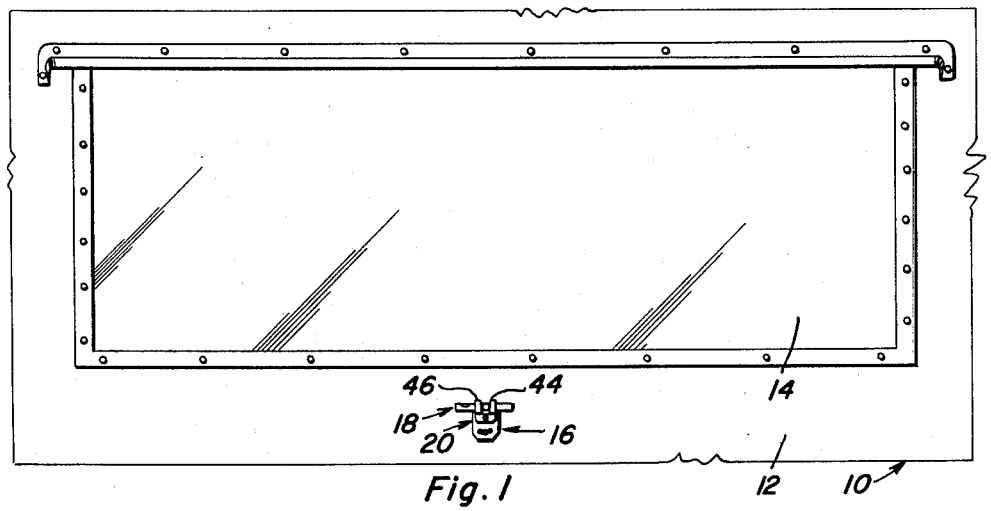
FIGURE 1 is a fragmentary front end elevational view of a house trailer shown with the leveling indicator of the instant invention mounted thereon.

Referring now more specifically to the drawings the numeral 10 generally designates a house trailer which includes a forward wall 12 having a window 14 therein. The leveling indicator of the instant invention is generally referred to by the reference numeral 16 and includes a T-shaped body generally referred to by the reference numeral 18 and a mounting clamp generally referred to by the reference numeral 20.

The T-shaped body 18 includes an elongated base leg 22 and an elongated cross leg 24 which is fixed to one end of the base leg and includes opposite end portions 26 and 28 that project outwardly from opposite sides of the base leg 22.

The end portion 28 is provided with a spirit level 30 a spaced distance from the base leg 22 and the latter is also provided with a spirit level referred to by the reference numeral 32. The spirit levels 30 and 32 as well as the legs 22 and 24 are disposed at right angles relative to each other and it will be noted that the cross leg 24 is generally cylindrical.

The mounting clamp 20 comprises an elongated strap 33 having opposite end portions 34 and 36. The end portion 34 is provided with a longitudinal slot 38 which is of a width sufficient to receive the base leg 22 therein and the slot 38 terminates a spaced distance from the terminal end of the end portion 34. The end portion 34 is also provided with an aperture 40 intermediate the terminal end of the end portion 34 and the adjacent end of the slot 38. Additionally, the strap 33 includes a second aperture 42 with which the first aperture 40 is registrable when the slotted portion of the strap 33 is curved about the cross leg 24 on opposite sides of the base leg 22. The portions 44 and 46 of the strap 33 disposed on opposite sides of the slot 38 define partial cylindrical clamp assemblies which clampingly engage the cross leg 24. A headed fastener 48 which is provided with a slotted head 50 has its shank portion 52 passed through the aligned apertures 40 and 42 and engaged with the supporting surface 54 against which the end portion 36 abuts in surface-to-surface contacting relation.

The end portion 36 is provided with an arcuate slot 56 which has the aperture 42 as its center of curvature. A headed fastener 58 including a slotted head 60 has its shank portion 62 passed through the slot 56 and also engaged in the supporting surface 54.

Figure 2:
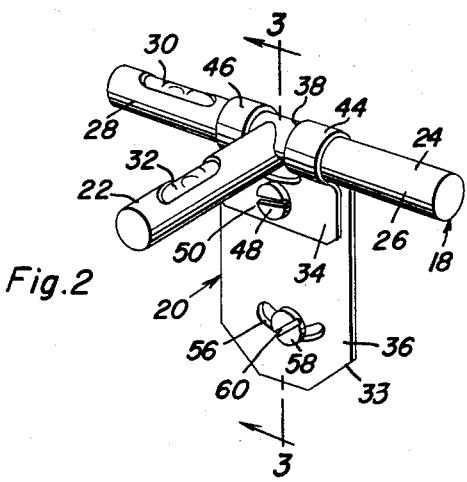
FIGURE 2 is a perspective view of the leveling indicator.
Figure 3:
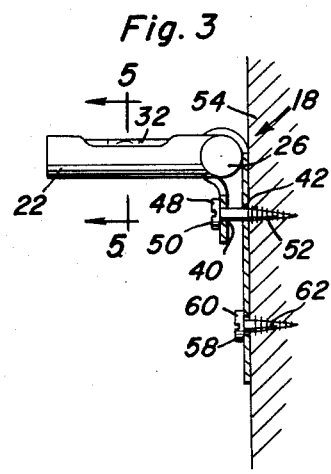
FIGURE 3 is a fragmentary sectional view taken substantially upon the plane indicated by the section line 3—3 of FIGURE 2.
Figure 4:
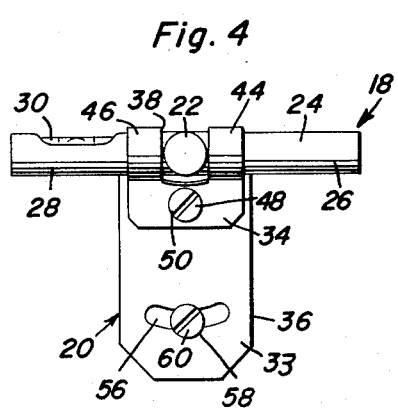
FIGURE 4 is a front elevational view of the leveling attachment.

In operation, the mounting clamp 20 is engaged with the body 18 as viewed in FIGURE 2 of the drawings and is then secured to the supporting surface 54 by means of the fasteners 48 and 58 in the manner illustrated in FIGURE 3 of the drawings. If it is desired to change the inclination of the base leg 22 relative to the supporting surface 54, the cross leg 24 is adjustably positioned about its longitudinal axis and then secured in adjusted rotated position by means of the fastener 48. At the same time the fastener 48 is tightened, and the clamp assemblies 44 and 46 are tightened about the cross leg 24. Then, if it is desired to change the inclination of the spirit level 30, the entire mounting clamp 20 may be adjustably positioned about the longitudinal axis of the fastener 48. As soon as the correct inclination of the spirit level 30 is achieved, the fastener 58 may be tightened. It is assumed that the leveling indicator is secured to the trailer 10 when the trailer 10 is known to be in a horizontal position. Thereafter, any time it is desired to again level the trailer 10, the trailer 10 may be jacked into the horizontal position as indicated by the spirit levels 30 and 32.

Figure 5:
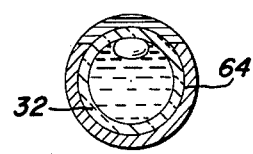
FIGURE 5 is an enlarged sectional view taken substantially upon the plane indicated by the section line 5—5 of FIGURE 3.

With attention now directed to FIGURE 5 of the drawings it may be seen that the base leg 22 is provided with a blind bore 64 in which the spirit level 32 is secured. The spirit level 32 may be secured within the bore 64 by closing the outer end of the bore 64 in any convenient manner such as by a plug. The spirit level 30 is similarly secured within the end portion 28 and accordingly, it may be seen that herein has been described a trailer leveling indicator which may be initially secured to a house trailer or the like when the trailer is in a horizontal position and thereafter utilized to indicate whether or not the house trailer is horizontally disposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A house trailer leveling indicator comprising a T-shaped body having a base leg and a cross leg fixed to one end of said base leg, including opposite end portions projecting outwardly from opposite sides of said base leg, and disposed at right angles to said base leg, a spirit level vial supported from each of said legs with said vials generally paralleling said legs and disposed at right angles to each other, the vial supported from said cross leg being spaced longitudinally along the latter from said base leg, a mounting clamp, the portions of said cross leg disposed adjacent said base leg and on opposite sides thereof and between the vial carried by said cross leg and said base leg being generally cylindrical, said mounting clamp including a base flange and a pair of adjustable partially cylindrical clamp members disposed on opposite sides of said base leg rotatably receiving and clampingly engaging said portions of said cross leg, and means on said flange adapting said flange for securement to a supporting surface.

2. The combination of claim 1 wherein said clamp assemblies include a single actuator for simultaneously increasing the clamping engagement of said clamp assemblies with said cross leg end portions.

3. The combination of claim 2 wherein said single actuator also comprises a part of said means adapted to secure said flange to a supporting surface.

4. The combination of claim 1 wherein said means adapted to secure said flange to a supporting surface also includes means adapted to mount said flange on a supporting surface for rotation about an axis extending at right angles to the longitudinal center axis of said cross leg.

5. The combination of claim 1 wherein said mounting clamp comprises an elongated strap having opposite end portions, one of said strap end portions having a longitudinal slot formed therein terminating a spaced distance from the free end thereof and receiving said base leg therethrough, the slotted portion of said strap being curved about said cross leg portion adjacent said base leg and defining said clamp assemblies, said terminal end of said strap having an aperture formed therein registrable with a second aperture formed in said strap a spaced distance from the remote end of said slot, a fastener passed through said apertures and adapted to be secured to a supporting surface against which said other end portion of said strap is abutted.

6. The combination of claim 5 wherein said other end portion of said strap has an arcuate slot formed therein having said second aperture as its center, a fastener passed through said slot and adapted to be secured in said supporting surface against which said other end portion is abutted.

References Cited in the file of this patent
UNITED STATES PATENTS

| | | |
|---|---|---|
| 896,371 | Forrer | Aug. 18, 1908 |
| 1,017,811 | Scelza | Feb. 20, 1912 |
| 1,456,431 | Frank | May 22, 1923 |